June 23, 1925.  
H. C. MUMMERT  
WING STRUT FASTENING FOR AEROPLANES  
Filed May 29, 1922

INVENTOR.  
HARVEY C. MUMMERT.  
BY  
ATTORNEY.

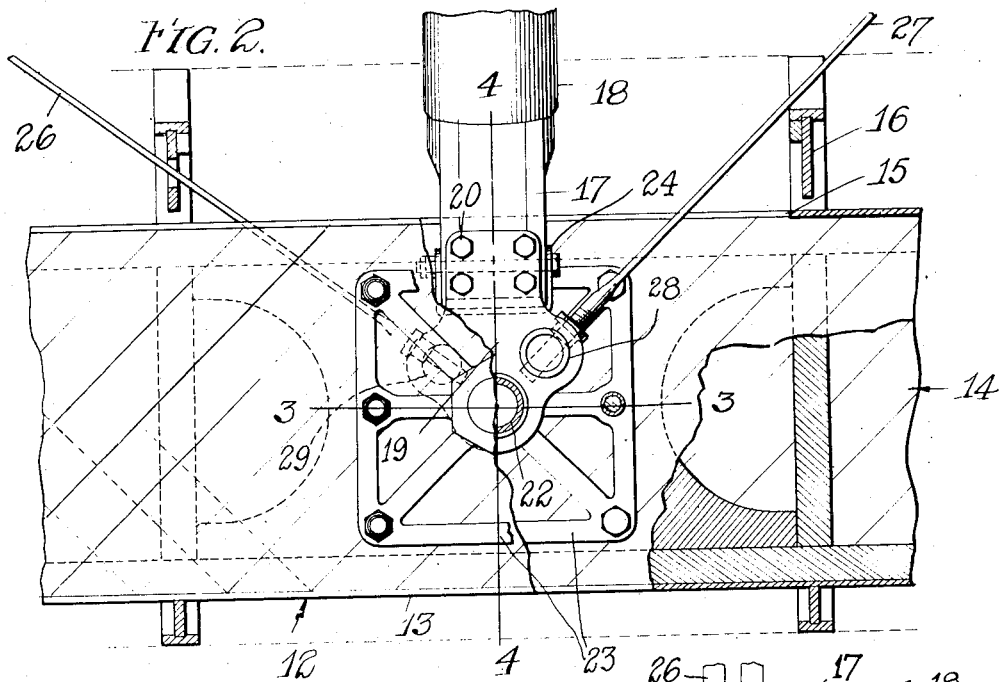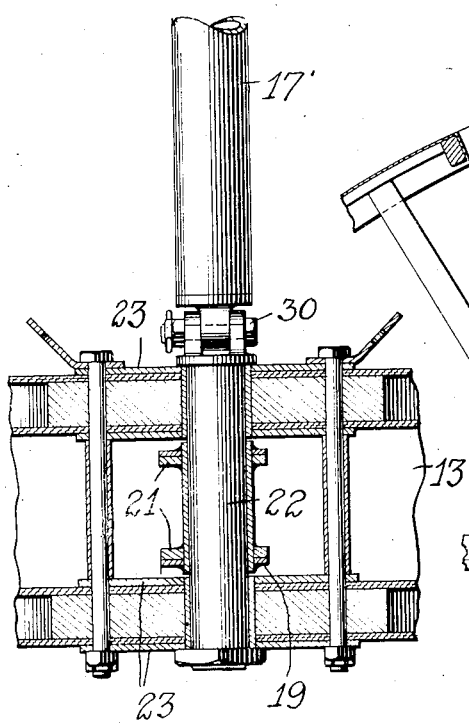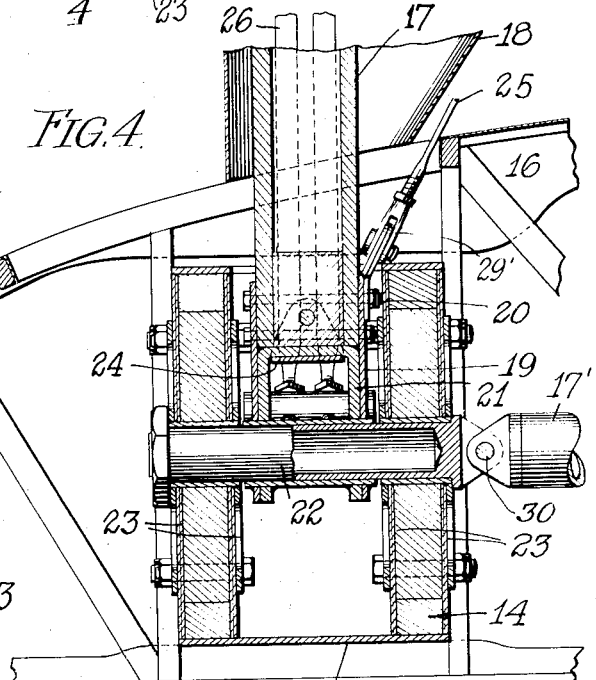

Patented June 23, 1925.

1,543,651

UNITED STATES PATENT OFFICE.

HARVEY C. MUMMERT, OF HOLLIS, NEW YORK, ASSIGNOR, BY MESNE ASSIGNMENTS, TO CURTISS AEROPLANE AND MOTOR COMPANY, INC., OF GARDEN CITY, NEW YORK, A CORPORATION OF NEW YORK.

WING-STRUT FASTENING FOR AEROPLANES.

Application filed May 29, 1922. Serial No. 564,357.

*To all whom it may concern:*

Be it known that I, HARVEY C. MUMMERT, a citizen of the United States, residing at Hollis, in the county of Queens and State of New York, have invented certain new and useful Improvements in Wing-Strut Fastenings for Aeroplanes, of which the following is a specification.

My invention relates to aeroplanes and more particularly to improvements in the manner and method of fastening strut ends to aeroplane wing structures.

An object of the invention is to so construct and relate the elements comprised in the strut fastening means that said elements, for the major part, are entirely enclosed and completely hidden within the confines of the outer covering of the wing.

A further object of the invention is to so relate the elements which enter into and form a part of the wing structure truss that the stresses set up in the wing structure are carried directly to points along the neutral axes of the wing beams.

In completely removing the elements comprised in the strut end fastening means from the line of air rush incident to flight, obviously the head resistance which such elements ordinarily offer is wholly eliminated; and in carrying the stresses set up in the wing structure to points along the neutral axes of the wing beams, obviously a stronger and lighter structure, other factors being equal, can be obtained.

In attaining the above objects I aim at the same time, to simplify the construction of the component parts of the strut fastening means and to so organize and relate such parts as to render all parts accessible, and if desired, visible; visibility being obtained by the use of transparent wing cover pieces in the immediate vicinity of the strut ends.

Other objects and advantages of the invention will be hereinafter pointed out.

In the drawings:

Figure 2 is a front end elevation, partly broken away, further illustrating the strut end fastening;

Figure 3 is a section on the line 3—3 of Figure 2; and,

Figure 4 is a section on the line 4—4 of Figure 2.

Figure 1:
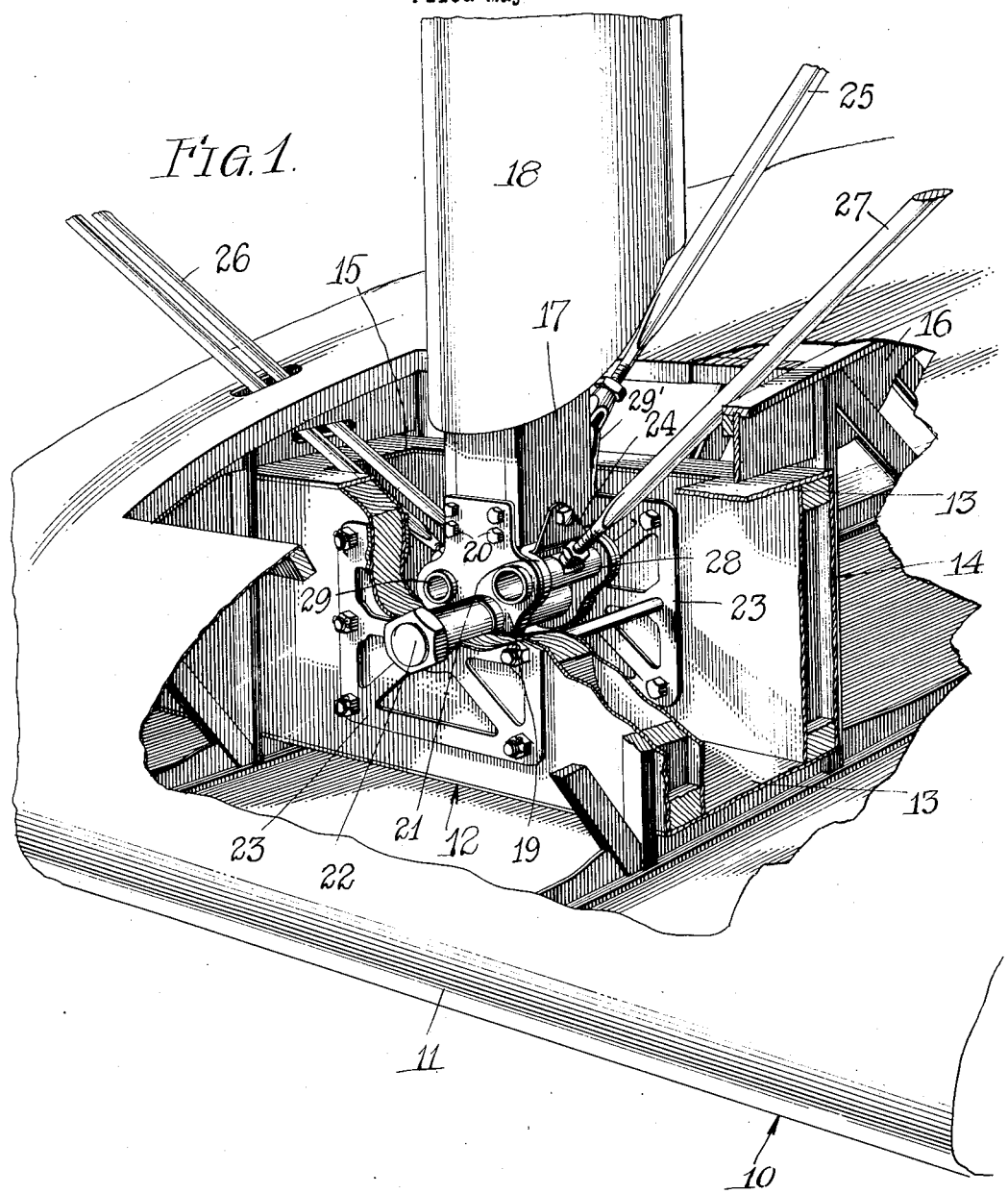
Figure 1 is a perspective view, with parts broken away, showing the strut end fastening and its relation to one of the wing beams of the wing.

In the embodiment of the invention selected for illustration, an aeroplane wing 10 of conventional profile is shown. Said wing is provided with the usual outer covering 11, which may be of sheet metal, veneer, or fabric, and with two or more wing beams (but one of which is shown) 12. Preferably the wing beam 12 is of the box-beam type; i. e., is hollow throughout the major portion of its length, though the top and bottom cover pieces 13 may be, if desired, dispensed with and deep and narrow box-beam members 14, which in effect provide a continuous beam, used instead. Where the top and bottom pieces 13 are provided, an opening 15 is formed in the top cover piece, through which the elements which enter into and form a part of the wing structure truss extend. The openings 15 are required to be provided only in the vicinity of the strut ends. In addition to the beams 12 and the outer covering 11 the wing 10 comprises ribs 16, compression members 17', and, if desired, internal brace wires (not shown). Such elements, excluding the covering 11, constitute the skeleton framework of the wing.

Within the hollow of the box-beam, or within the space between the beam members 14, the strut end fittings are disposed. Such fittings, but one of which is shown, are preferably so related to the wing beams as to concentrate the stresses set up in the wing structure at points along the neutral axes of the wing beams. The wing struts, which comprise a strut proper 17 and an outer streamline casing 18, are extended at their opposite ends beyond the outer covering 11 of the wing to enter the space between the beam members 14 or the hollow of the box-beam with which they, the struts, are associated. On the opposite faces of the extended portion of the strut ends face plate 19 are provided, the plates in each instance being fastened to the strut ends by thru-bolts 20. Between the face plates 19 a substantially U shaped compression member 21 is disposed, the arms or extensions of said member being contiguous to the face plates with the hight portion in bearing contact with the end of the strut against which the face plates are secured. Together, the face plates and the compression member constitute a strong metal fitting by means of which the strut end is fastened to the wing beam. At points along the neutral axes of the wing beams pins 22 are disposed, each of the several pins, but one of which is shown, being extended through both beam members of the box-beam and across the space therebetween, as well as through the fitting of which the face plates 19 and the compression member 21 form a part. In this manner the strut ends are held in place. To re-enforce the beam members at the points where the pins 22 are disposed, face plates 23 are provided, such plates being disposed on the opposite faces of both beam members as illustrated in Figure 3. In addition to the U shaped compression member 21, each strut end is provided with a metal strap 24 which is carried across the bight portion of the compression member and extended contiguous to the opposite faces of the strut extension, whereby an appropriate socket for the strut end is formed by the strap and the face plates 19 collectively.

From the above description it will be observed that the strut ends enter the space between the beam members and that the fittings provided on the ends of the struts are not only completely enclosed within the confines of the box-beam, but are necessarily enclosed within the confines of the outer covering of the wing. Thus disposed, they are completely removed from the line of air rush incident to flight. The brace wires for the wing structure, of which any number may be provided, are designated as 25, 26, and 27. The wires 26 and 27 are carried directly to the fittings at the strut ends. Preferably such wires are of streamline section and at their ends are externally threaded, whereby in their assembly they may be adjustably fastened to the strut end fittings. To receive the threaded ends of the brace wires 26 and 27, pins 28 and 29 are provided, the pins being disposed on opposite sides of the pin 22 and mounted to rotate. Each of such pins is in turn provided with a threaded opening into which the threaded ends of the brace wires extend. Thus arranged, a very efficient and simple form of brace wire fastening means is provided. The brace wire 25, instead of being anchored to the fitting by means of a rotatable pin, is fastened to an ear 29' formed by extending one of the face plates 19 off in the direction of the wire length. Preferably the compression member 17 of the wing framework is directly fastened as at 30 to the pin 22 which holds the strut end in place.

That the strut end fastening means may be accessible, an opening 31 is formed in the wing covering in the vicinity of each strut end and if desired, such opening 31, upon the completion of the assembly of the wing structure, may be effectually covered over by means of a suitable transparency (not shown). Thus organized, the fitting is visible for inspection purposes at all times.

A strut end fastening means characterized as above set forth is especially adapted to the larger types of aircraft wherein box-beams or hollow beams are desirable. Where such fastening means is used, an exceptionally clean joint is provided at the strut ends and all parts which would otherwise offer considerable resistance to the forward travel of the machine are wholly removed from view. The disposition of the connections, at points along the neutral axis of the wing beams, is also desirable for structural reasons as well as for reasons hereinbefore pointed out. By "neutral axis" is meant, in referring to the wing beams, that axis or point at which the tension and the compression stresses are equilibrated.

While I have described my invention in detail in its present preferred embodiment, it will be obvious to those skilled in the art after understanding my invention, that various changes and modifications may be made therein without departing from the spirit or scope thereon. I aim in the appended claims to cover all such modifications and changes.

What I claim is:—

1. In an aeroplane, a supporting surface including in its structural framework a hollow beam, a wing strut, a fitting mounted on the end of the wing strut and enclosed for the major part within the hollow of said beam, and a pin extended across the hollow beam at a point along its neutral axis, said pin being in engagement with said fitting to provide a fastening means for the wing strut.

2. In an aeroplane, wing strut, a hollow beam into the hollow of which one end of the wing strut is extended, a fitting mounted on the inside of the hollow beam to provide a fastening means for the wing strut, and a pin extended across the hollow beam at a point along its neutral axis, said pin being extended through said fitting.

3. In an aeroplane, a wing strut, spaced beam members so related one to the other as to provide in effect a continuous beam, a fitting mounted in the space between the beam members, said fitting being fastened to the wing strut, a pin extended across the space between said beam members to provide a fastening for the strut end, and reenforcing plates provided on the opposite faces of the beam members through which said pin extends.

4. In an aeroplane, a wing strut, a hollow beam into hollow of which one end of the wing strut is extended, a fitting mounted on the inside of the hollow beam to provide a fastening means for the wing strut, anchorages formed upon said fitting, brace wires fastened to said anchorages and likewise extended into the hollow of said beam, and a pin extended across the hollow beam as a fastening for said fitting.

5. In an aeroplane, a wing strut, a hollow beam into the hollow of which one of the wing strut is extended, a fitting mounted on the strut end extended into the hollow of said beam, brace wires anchored to said fitting and likewise extended into the hollow of said beam, opposed plates fastened against opposite faces of said beam, and a fastening pin for the strut fitting extended thru said plates, thru said beam and across the hollowed-out portion thereof.

6. In an aeroplane, a hollow beam, a strut extended at one end into the hollow of said beam, a fitting mounted on the enclosed strut end, pins carried by said fitting, brace wires extended into the hollow of the beam and anchored to said pins, and a fastening pin for the strut fitting extended thru the beam at a point along its neutral axis.

7. In an aeroplane, a hollow beam, a wing strut extended at one end into the hollow of said beam, a fitting mounted on the enclosed strut end, a fastening pin extended across the hollow of said beam and thru said fitting, anchorages for brace wires formed upon said fitting, brace wires fastened to the anchorages and extended into the hollow of the beam, and an anchorage for a further brace formed upon one end of said pin.

In testimony whereof I hereunto affix my signature.

HARVEY C. MUMMERT,